United States Patent [19]

Baranyai et al.

[11] Patent Number: 4,608,693
[45] Date of Patent: Aug. 26, 1986

[54] FAULT DETECTION ARRANGEMENT FOR A DIGITAL CONFERENCING SYSTEM

[75] Inventors: Lawrence Baranyai, Howell; John R. Colton, Freehold, both of N.J.

[73] Assignee: AT&T Bell Laboratories, Murray Hill, N.J.

[21] Appl. No.: 607,829

[22] Filed: May 7, 1984

[51] Int. Cl.$^4$ .............................................. G06F 11/10
[52] U.S. Cl. ...................................... 371/49; 364/738; 370/62
[58] Field of Search ...................... 371/49, 50; 364/738, 364/787, 786, 704, 784, 741, 760; 370/62, 109

[56] References Cited

U.S. PATENT DOCUMENTS

| 3,596,072 | 7/1971 | Iwamoto | 364/738 |
| 3,758,760 | 9/1973 | Cowan | 364/738 |
| 3,925,647 | 12/1975 | Louce | 364/738 |
| 4,079,457 | 3/1978 | Miller | 364/738 |
| 4,081,860 | 3/1978 | Miller | 364/738 |
| 4,084,252 | 4/1978 | Miller | 364/738 |
| 4,163,211 | 7/1979 | Miura | 364/738 |
| 4,224,680 | 9/1980 | Miura | 364/738 |
| 4,224,681 | 9/1980 | Lewine | 364/738 |
| 4,304,002 | 12/1981 | Hunt | 371/49 |
| 4,481,624 | 11/1984 | Baranyai et al. | 370/62 |
| 4,523,210 | 6/1985 | Kregness | 364/738 |

Primary Examiner—Michael R. Fleming
Attorney, Agent, or Firm—John K. Mullarney; Thomas Stafford

[57] ABSTRACT

The disclosure relates to error/fault detection in signal processing systems such as those employed in a time division multiplex conferencer. The digital message samples (of the conferees) and the accompanying parity bits are delivered to a signal processor e.g., a binary arithmetic adder (10). The adder sums the message samples and this sum is coupled to a first parity tree (11), which in response thereto generates a first parity bit. The carries generated by the summing operation and coupled to a second parity tree (12) along with the message parity bits and the second parity tree generates a second parity bit therefrom. The first and second parity bits are compared (13) and if they differ a fault exists. Corrective action is taken immediately—the faulty conference "leg" is removed from the conference connection without affecting the remaining legs in the conference or any other conference.

14 Claims, 12 Drawing Figures

FIG. 3

CASE 3.1: NO ERRORS.

|  | (a) | (b) | (c) | (d) | (e) | (f) | (g) | (h) |
|---|---|---|---|---|---|---|---|---|
| $C_2\ C_1$ | 00 | 00 | 00 | 00 | 01 | 11 | 01 | 11 |
| $A_2\ A_1$ | 00(1) | 00(1) | 00(1) | 00(1) | 00(1) | 00(1) | 00(1) | 00(1) |
| $B_2\ B_1$ | 00(1) | 01(0) | 10(0) | 11(1) | 00(1) | 01(0) | 10(0) | 11(1) |
| $S_2\ S_1$ | 00 | 01 | 10 | 11 | 01 | 10 | 11 | 00 |
| $P_{ACT}$ | 1 | 0 | 0 | 1 | 0 | 0 | 1 | 1 |
| $P_{EXP}$ | 1 | 0 | 0 | 1 | 0 | 0 | 1 | 1 |

CASE 3.2: ERROR (*) IN EITHER A DATA WORD,
A PARITY BIT, OR SUMMING.

|  | (a) | (b) | (c) | (d) | (e) |
|---|---|---|---|---|---|
| $C_2\ C_1$ | 00 | 00 | 00 | 00 | 00 |
| $A_2\ A_1$ | 00(1) | 00(1) | 00(1) | 00(1) | 00(1) |
| $B_2\ B_1$ | 01*(1) | 1*0(1) | 00(0*) | 00(1) | 00(1) |
| $S_2\ S_1$ | 01 | 10 | 00 | 01* | 1*0 |
| $P_{ACT}$ | 0 | 0 | 1 | 0 | 0 |
| $P_{EXP}$ | 1 | 1 | 0 | 1 | 1 |

FIG. 6

FAULT DETECTION ARRANGEMENT FOR A DIGITAL CONFERENCING SYSTEM

TECHNICAL FIELD

This invention relates to error/fault detection in signal processing systems and, more particularly, to parity detection circuitry useful in a time division multiplex conferencing system.

BACKGROUND OF THE INVENTION

The copending application of L. Baranyai et. al. Ser. No. 391,698, filed June 24, 1982, now U.S. Pat. No. 4,481,624 issued Nov. 6, 1984 discloses a time division multiplex conferencer for continuously summing and outputting digital message samples received from n subscribers in n respective time slots. Message samples collected from each subscriber of a conference connection are summed during a first time frame and outputted during a second time frame. Besides establishing one or more conference-type connections between two or more subscribers, the conferencer also has the ability to establish broadcast and monitor connections.

In the conferencer, as in all signal processing systems, the avoidance of error is of major interest. Numerous techniques have been devised heretofore to reduce the probability of an error going undetected. The simplest and most widely used approach is the parity check method. A parity check bit is derived for each digital message sample and it is transmitted to the signal processor (e.g., the summing circuit of the conferencer) along with the respective message sample. A parity check circuit of conventional design can then be used to "flag" errors in the message samples delivered to the signal processor. However, faults may occur within the signal processor itself and an erroneous output(s) will thus be produced. In fact, the output can be in error even though a processor generated, parity bit might indicate otherwise.

Proper operation of a signal processor (e.g., conferencer summing circuit) can be verified by a brute force method. For example, test vectors can be sent to the processor in a dedicated time slot(s) to "exercise" the processor circuitry. For a 15-bit adder, this approach would require $2^{15} \cdot 2^{15}$ input sequences to the signal processor; and, of course, the resultant output sequences must be verified. Such an approach requires spearate testing apparatus and it takes one or more time slots out of service. Alternatively, a redundant processor arrangement can be used for verification purposes—but redundancy is costly.

SUMMARY OF THE INVENTION

It is a primary object of the present invention to achieve a parity circuit design for the detection of errors in either the input sequences to or output sequences from a digital signal processor such as an adder.

A further object of the invention is to provide a digital conferencing system wherein faults are detected in real time and immediate action taken on a faulty conference "leg" while not affecting the remaining legs in the conference or any other conference; the faulty leg should be "disconnected" for the duration, but only for the duration, of the fault.

In accordance with the present invention, a plurality of digital message samples and their respective parity bits are delivered to a signal processor, e.g., a binary adder. The adder sums the message samples and this sum is coupled to a first parity tree, which in response thereto generates a first parity bit. The carries generated by the summing operation are coupled to a second parity tree along with the message parity bits and the second parity tree generates a second parity bit therefrom. The first and second parity bits are compared and if they differ a fault exists. Corrective action is then taken.

In accordance with an aspect of the invention, the input message signals delivered to a digital conferencing system, such as that disclosed in the cited Baranyai et. al. case, are continually monitored in real time during the signal processing of the same and if a fault is detected in either the input signals to or the output signals from the signal processor(s) immediate action is taken. The faulty conference leg (i.e. the faulty time slot) is removed from the conference connection without affecting the remaining legs in the conference or any other conference. The faulty connection or time slot is removed for the duration, and only for the duration, of the fault.

BRIEF DESCRIPTION OF THE DRAWINGS

The invention will be more fully appreciated from the following detailed description when the same is considered in connection with the accompanying drawings, in which;

FIG. 3 shows tables useful in the explanation of the present invention;

FIGS. 4 through 10 are block and waveform diagrams descriptive of the digital conferencing system of the cited Baranyai et. at. case, with the fault detection arrangement of the present invention included therein.

DETAILED DESCRIPTION

The time division multiplex conferencer disclosed in the Baranyai et. al. application establishes one or more conference connections between two or more subscribers. The input (linear) digital message samples of the subscribers occupy separate and distinct time slots of a repetitive frame. For error detection purposes, each message sample (e.g., of 15 bits) that is sent to the conferencer is accompanied by a parity check bit. And, parity check bits are generated by the conferencer's signal processors along with the digital signals outputted therefrom. For purposes of explanation, it will be assumed that "odd" parity is used throughout, however, the principles of the present invention can just as readily be implemented in accordance with "even" parity.

For proper operation, it is important that errors or faults be detected and corrective action taken as soon as possible. An error can occur in the input signal sequences to or output signal sequences from a signal processor; and, of course, an error or fault may occur within the processor itself. The parity detection circuitry of the invention serves to monitor for these errors or faults and it does so in real time. As will be explained in greater detail hereinafter, a fault can be immediately isolated to a given time slot of a conference connection and the faulty leg (i.e., time slot) removed from the conference without affecting the remaining legs of the conference.

The conferencer adder 310 (FIG. 4) is a signal processor which adds or sums the message samples from selected time slots. It adds the message samples of two or more subscribers to a conference connection using a "loop-back" arrangement. For example, when the message samples of two time slots are summed in adder 310 the result (sample sum) is stored in an accumulator RAM 510 or 520. When the next time slot of the next conferee appears on bus 206 this new message sample is summed with the previously summed and stored message sample. This new sum is then placed in store and is subsequently added to the message sample of the next conferee, and so on. In this manner all of the message samples of the conference-connected subscribers are summed during a frame, and the process is repeated frame after frame until the conference terminates.

Figure 1:
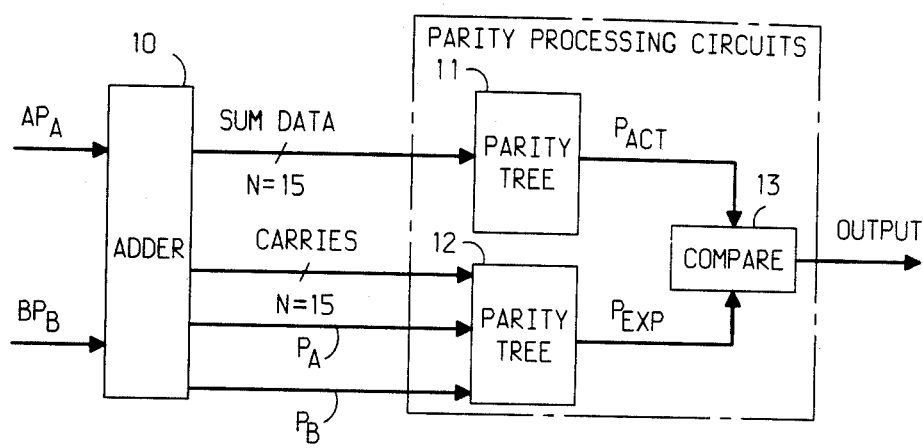
FIG. 1 is a functional block diagram showing the error/fault detection circuitry in accordance with the present invention.

Turning now to the functional block diagram of FIG. 1, a pair of data words (e.g., message samples) A and B are delivered to an adder 10. For purposes of explanation, it is assumed that the data words comprise 15 bits. Each data word is accompanied by a parity bit ($P_A$, $P_B$). The adder here is assumed to include a loop-back arrangement (not shown) such as described above. Therefore, data word B, for example, may represent the sum of n previous summing operations. In any event, the adder 10 binarily sums the data words A&B to provide a sum data word of 15 bits.

The adder 10 may be of any known design, such as a twos complement adder, a sign magnitude adder, etc. Moreover, the invention is in no way limited to an adder with the described loop-back arrangement. For example, the adder 10 might just as readily comprise an adder made up of cascaded summing stages. Accordingly, and as will be more evident hereinafter, the principles of the present invention are applicable regardless of the adder configuration or the manner in which the binary arithmetic addition is carried out.

A binary arithmetic addition is by and large the basic operation of all digital signal processing systems employing binary arithmetic operations. For example, a multiplication operation in a signal processor is really an iterative addition operation. A subtraction operation is really an algebraic addition, and once the sign is accounted for the operation is one of addition. For example, subtraction is accomplished in a twos complement adder (e.g., out-adder 640 of FIG. 4) by complementing the subtrahend and adding a binary one to the least significant bit. And, division is, of course, an iterative subtraction operation. Accordingly, it will be apparent that the present invention can be advantageously utilized to detect errors in any and all digital signal processing systems employing binary arithmetic operations.

Figure 11:
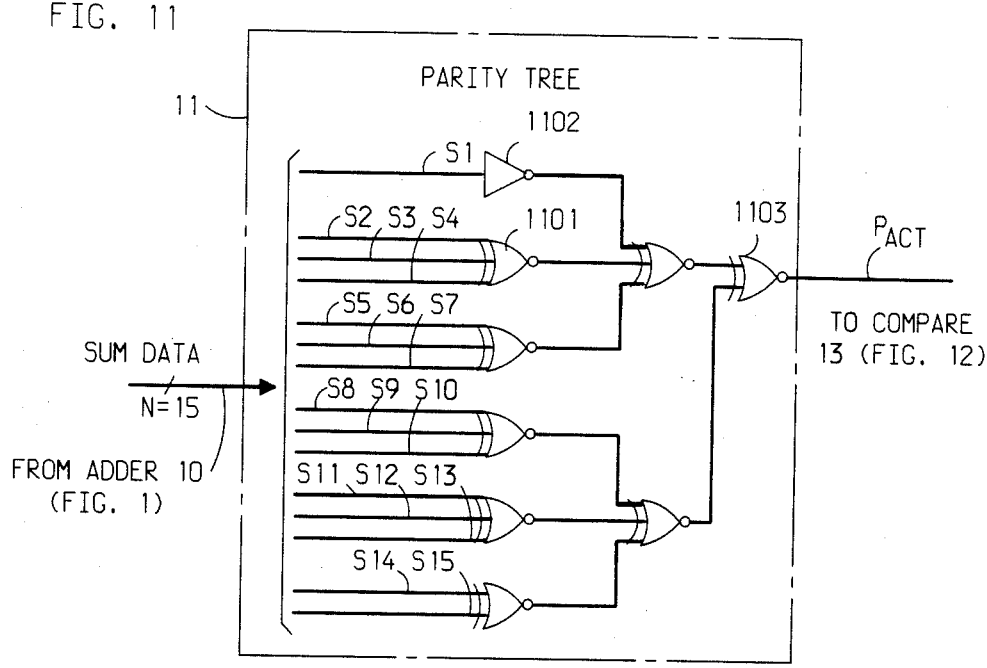
FIGS. 11 and 12 show typical parity circuits which can be used in carrying out the invention.
Figure 12:
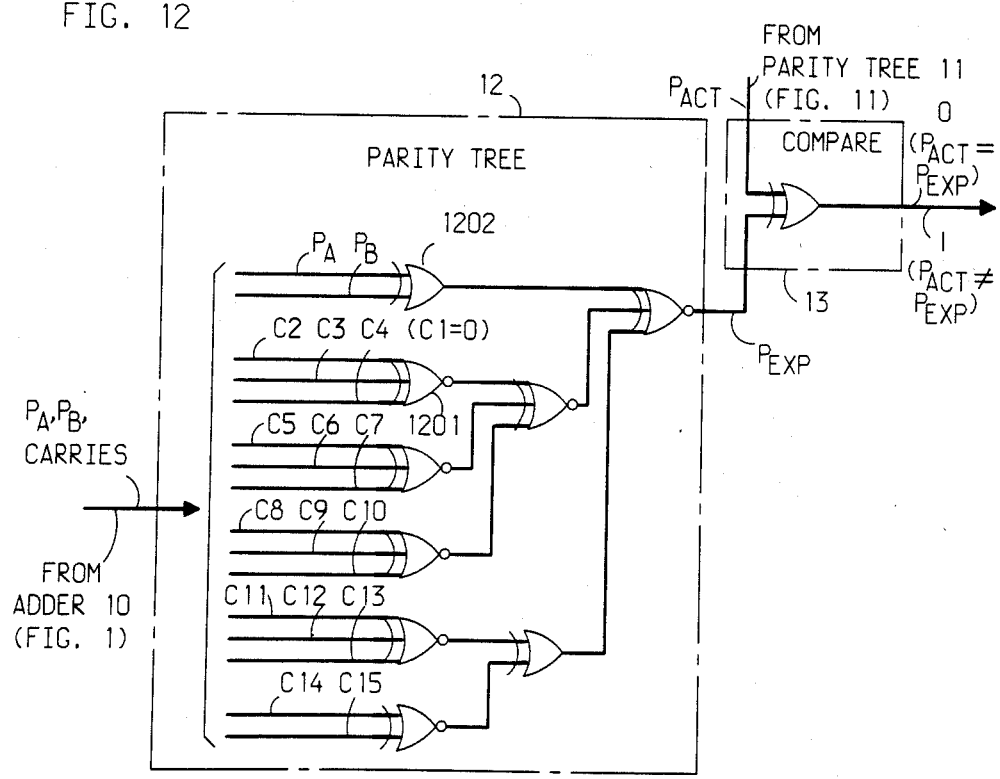

Returning now to FIG. 1, the sum data (i.e., the sum of data words A&B) is coupled to a parity tree 11, such as that shown in FIG. 11. Parity tree 11 is operative in response to this 15-bit sum data word to produce a first parity bit ($P_{ACT}$). The carries generated by the summing operation are coupled to a second parity tree 12, such as shown in FIG. 12. The parity bits $P_A$ and $P_B$ are passed through the adder and also delivered to the input of parity tree 12. The parity tree 12 is operative to generate a second parity bit ($P_{EXP}$). These first and second parity bits are then compared in the comparison circuit 13 and if they differ a binary "1" is generated to indicate an error or fault. Corrective action is then taken.

A binary "1" error indication is generated by the parity circuit of FIG. 1 for a single bit error in either input data word A or B or for a single bit error in the output sum data. And, since the parity detection circuit operates in real time, the error or fault can be isolated to a given time slot and immediate action taken with respect thereto.

In accordance with the principles of the present invention, a relationship can be established between the parities of the input data words and the sum data. The expected parity ($P_{EXP}$) of the sum data word is given by the Boolean expression:

$$P_{EXP} = 1 \oplus P_A \oplus P_B \oplus C_1 \oplus C_2 \oplus C_3 \oplus \ldots C_N, \quad (1)$$

where $C_1$, $C_2$, $C_3$ ... represent the respective "carry" operations of an N-bit adder. If no errors are present, this is equal to the actual parity ($P_{ACT}$) given by:

$$P_{ACT} = 1 \oplus S_1 \oplus S_2 \oplus S_3 \oplus \ldots S_N, \quad (2)$$

where $S_1$, $S_2$, $S_3$ ... $S_N$ represent the sum of data bits $A_1 B_1$, $A_2 B_2$, $A_3 B_3$ ... $A_N B_N$, respectively.

For single bit errors present on either input data words A or B or for single bit errors on the output sum(s): $P_{EXP} \neq P_{ACT}$. If on comparison, the expected and actual parities differ, an error or fault is known to exist. Thus, errors are detected immediately as they occur.

Figure 2:
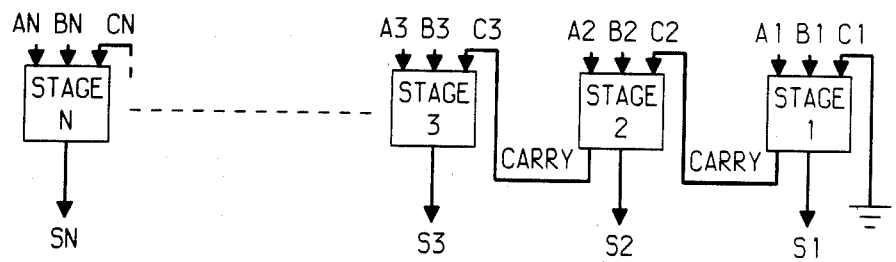
FIG. 2 is a simplified showing of a binary adder.

FIG. 2 and particularly the tables of FIG. 3 are useful in demonstrating that $P_{EXP} = P_{ACT}$ if no errors are present, and that $P_{EXP} \neq P_{ACT}$ if a single error exists on any bit of data word A or B or the sum data S. To demonstrate this for a 15-bit adder would be exhaustive and, in fact, unnecessary. Therefore, the demonstration is limited to a 2-bit adder for 2-bit input data words A and B. Since an N-bit adder is really a cascade or extension of this 2-bit adder, it follows that the demonstrative technique is applicable to an N-bit adder.

FIG. 2 is a simplified showing of an N-bit adder, i.e., an adder of N stages for adding or summing two data words A&B of N-bits each. For demonstration purposes, however, it is assumed herein that the data words to be added comprise two bits each ($A_1 A_2$ and $B_1 B_2$) and thus only a binary adder of two stages is required.

Turning now to FIG. 3, a limited number of examples are set forth for the two cases, i.e. Case 3.1 (no errors) and Case 3.2 (with errors). Considering the table of Case 3.1, the examples designated (a) through (h) set forth assumed values for the two bits of the data words A and B. The parity bit that accompanies each 2-bit data word is shown in parentheses adjacent thereto. The value ("1" "0") of each parity bit is established in accordance with the odd parity principle. The carry inputs ($C_1$ $C_2$) to the two adder stages is also shown. In FIG. 2, the carry input of the first stage is shown grounded and therefore $C_1 = 0$. However, the more general case is assumed for the table of case 3.1, i.e., the carry input ($C_1$) to the first adder stage may be either a binary "0" or "1". The value of $C_2$ is, of course, determined by the binary addition carried out in the first stage of the adder. If at least two of the three bits to be added ($A_1$, $B_1$, $C_1$) are binary "1" bits then $C_2 = 1$. The sum data word ($S_1 S_2$) is given for each of the assumed examples. Since binary addition is so routine at this point in time, no explanation of the same is deemed necessary. The values for the actual parity ($P_{ACT}$) and the expected parity ($P_{EXP}$) are derived in accordance with the Boolean equations (1) and (2) supra and these are set forth in the last two rows of the Case 3.1 table. In each instance, $P_{EXP}=P_{ACT}$, indicating the absence of errors. Either of the latter parity bits can be used as the parity check bit for the sum data word ($S_1 S_2$). And, in each case, the sum data and its parity comprise an odd number of binary "1" bits.

Turning to the table of Case 3.2, the bit designations are the same and the table is similar to that of Case 3.1, except that errors, marked by an asterisk, are indicated. In examples (a) and (b) the errors are assumed to occur in the B data word, in example (c) a parity bit is in error, and in examples (d) and (e) the generated sum is faulty. In example (a) the $B_1$ data bit is in error and, as a consequence, an erroneous sum data word ($S_1 S_2$) results. However, when the values for the actual parity ($P_{ACT}$) and expected parity ($P_{EXP}$) are derived in accordance with the Boolean equations (1) and (2), these values differ ($P_{EXP} \neq P_{ACT}$) and an error is known to exist. The values for $P_{ACT}$ and $P_{EXP}$ are given in the last two rows of the table of Case 3.2 and, as can be seen, the error is "flagged" in each instance. The Boolean equations for $P_{ACT}$ and $P_{EXP}$ are readily implemented in circuit form and thus errors are detected in real time in accordance with the invention.

For the sake of brevity only a limited number of examples, using 2-bit data words, has been set forth in FIG. 3. These are believed sufficient to demonstrate the efficacy of the invention. Since an N-bit adder for N-bit data words (e.g., N=15) is simply a cascade or extension of the assumed two bit adder for 2-bit data words, it should be evident to those skilled in the art that the demonstrated technique is clearly applicable to any adder of N stages.

The digital conferencing system of the cited Baranyai et. al. application including the parity/fault detection arrangement of the present invention will now be described. A brief overview of the system will be given with respect to FIG. 4 which shows an example of a linear time division multiplexed conferencer 100 in which the time slot input first passes through buffer 205 to twos complement adder 310 which performs the addition of linearly encoded incoming voice or data samples and passes these summed samples, as will be discussed, for storage in accumulator RAM 510 (520) respective to time slots of the same conference connection. The conferencer includes circuitry (1600) for generating and holding first and second accumulator RAM 510 (520) memory addresses respective to a first and second time slot in which the second address is used to prefetch and hold in latch 620 a summed message sample respective to a second conference connection and in which the first address is used to store a summed message sample in accumulator RAM 510 (520) respective to a first conference connection. In the event the first and second time slots are adjacent time slots assigned to the same connection, the summed message sample respective to the first time slot is alternatively loaded into latch 620. In this manner the summed message sample prefetched from accumulator RAM 510 (520) includes the message contribution of the first time slot and is properly summed with the incoming message sample respective to the second adjacent time slot.

The conferencer 100 may also select one of a multiple of alternate digital messages for storage in accumulator RAM 510 (520) in place of the summed message sample outputted from in-adder 310. An alternate message may be selected in response to the logic state of connection mode bits CMBT and CMBR outputted from connection data circuit 1400, in response to a positive or negative overflow condition resulting from the summation process, in response to a first access to accumulator RAM 510 (520) respective to a connection during a respective time slot frame or in response to a parity error (not shown) detected during the summation process. Twos complement out-adder 640 effectively subtracts the contribution of a time slot from the summed message prior to outputting via data bus 750. The conferencer 100 also may select an appropriate alternate digital message sample for outputting respective to a conferee (time slot). This alternate digital message sample is determined by the mode (mode control bits CMBT and CMBR) externally assigned to each respective time slot of a conference connection.

A time slot can be externally assigned to a conference mode, which permits a time slot to send and receive message samples; to a broadcast mode, which permits the time slot only to transmit message samples to the conference connection; or to a monitor mode, which permits a time slot only to receive message samples from the conference connection. The alternate message, in place of the summed message sample, is provided under the control of sample select circuit 1700 in response to the assigned mode, or under control of output control circuit 1800 in response to the time slot mode or in response to an error detected by the subtraction process performed by out-adder 640.

Each conference connection is assigned a unique accumulator RAM 510 (520) memory location (address) which is used for accumulating summed message samples contributed by each time slot of the connection during a respective time slot frame. The assigned accumulator RAM 510 (520) memory location and mode information is stored on a per time slot basis in connection data circuit 1400. Connection data circuit 1400 is sequentially addressed by address generator circuit 320 respective to a time slot.

The memory locations associated with connection data circuit 1400 for the storage of connection data are loaded and changed via service interface circuit 241 responsive to serial input BUSDAT.

The connection data, which comprises mode bits CMBT and CMBR, and accumulator RAM 510 (520) memory location assigned to a conference connection, is the means by which respective incoming time slots are identified for connection to output bus 750.

Encoded voice samples respective to a time slot are stored in a sample RAM 610 memory location respective to a time slot address. Sequential memory addresses are provided by address generator circuit 320 respective to each incoming time slot and are applied to sample RAM 610 via address bus DRAD.

Accumulator RAMs 510 and 520 are alternately loaded with summed message samples from input control circuit 1500 and alternately unloaded for supplying summed message samples to the output. RAM control circuit 1600 in response to time frame pulse TSYNC and clock signals from clock generator circuit 220 is the means by which accumulator RAM 510 and accumulator RAM 520 are alternated between a storage cycle and a supply cycle respective to a first and a second time frame. For example, during a first time frame each time slot of a connection is sequentially addressed and its message sample (via IBDAT) is summed by in-adder 310 with summed message samples received from previously addressed lines of the conference connection during a first time frame. The new summation from input control circuit 1500 is then stored in accumulator RAM 510. Simultaneously therewith, summed message samples stored in accumulator RAM 520 during a preceding time frame are unloaded and supplied to the output via RAM latch 630 and out-adder 640.

During a next time frame, summed message samples are stored in accumulator RAM 520 and simultaneously therewith, priorly summed message samples stored in accumulator RAM 510 during the preceding time frame are unloaded and supplied to the output.

In order to offset propagation delays and facilitate the process of summing an incoming message sample respective to a first time slot assigned to a connection, a summed message sample respective to a second time slot is prefetched from accumulators 510, 520 and stored in RAM select latch 620 prior to loading the summed message sample respective to a first time slot. RAM select circuits 540 and 550, under control of RAM control circuit 1600, are used by accumulators 510, 520 to prefetch a second summed message sample prior to loading a first summed message sample.

The read/write addresses respective to second and first time slots for accessing RAMs 510 (520) are supplied to RAMSEL 540 (RAMSEL 550) from connection data circuit 1400 via address bus RARAD and address bus WARAD respectively. In turn, RAM control circuit 1600 causes the read address respective to a second time slot (RARAD) to be gated through RAM select circuit 540 (550) to accumulator RAMs 510 (520) during the first half of a first time slot in order to prefetch a summed message sample respective to a second time slot. During the second half of a first time slot, RAM control circuit 1600 causes accumulator RAM 510 (520) write address (WARAD) respective to a first time slot to be gated through RAM select circuit 540 (550) in order to store a summed message sample respective to the first time slot into accumulator RAM 510 (520). In this manner, accumulator RAM 510 (520), during a storage cycle, is alternately addressed each time slot for prefetching a summed message sample respective to a second time slot and for storing a summed message sample respective to a first time slot. Simultaneously therewith, accumulator RAM 520 (510) is addressed each time slot for supplying summed message samples to output bus 750.

The prefetched summed message sample(s) held in RAM select latch 620 is inputted to in-adder 310 via the PSDAT bus for summation with a respective incoming message sample. A reset bit (bit 16 of PSDAT) is processed by RSB processor circuit 260 for determining whether an incoming time slot of a conference connection is the first access to accumulator RAM 510 (520) for the connection respective to a time frame. If the incoming time slot is the first access to accumulator RAM 510 (520) then RSB processor circuit 260 directs input control circuit 1500 to load the message sample respective to the first accessing time slot into accumulator RAM 510 (520) in place of the summed message sample outputted from in-adder 310. In this manner accumulator RAM 510, 520 is refreshed each respective storage cycle by starting a new conference sum thereby eliminating the problem of pausing at the beginning of each time frame.

Input control circuit 1500, in response to mode control bits CMBT and CMBR or in response to an error in the summation process, selects an appropriate alternative digital message sample for storage in accumulator RAM 510 (520). For example, an alternate digital message sample is selected and stored in accumulator RAM 510 (520) for an imcoming time slot assigned to the monitor mode in place of the incoming digital message sample respective to the time slot. In this manner, a time slot assigned to the monitor mode is prevented from transmitting to the conference connection.

Input control circuit 1500 also selects an appropriate alternate digital message sample for storage in accumulator RAM 510 (520) in the event a positive or negative overflow results from the summation of message samples by in-adder 310.

Turning now more specifically to the parity/fault detection arrangement in accordance with the present invention, the input message samples delivered to the conferencer occupy separate and distinct time slots of a repetitive frame. Each message sample is accompanied by a parity check bit. The input message samples of selected time slots are added together by the adder 310. The output sum data (SMDAT) is delivered to the control circuits 1500 and is also coupled to the parity processing circuits 31. Concurrently therewith, the carries from the summing operation are also coupled to the parity processing circuits 31 along with the parity bits of the summed message samples. As described above, the first and second parity bits ($P_{ACT}$) and ($P_{EXP}$) are compared, and will be the same in the absence of error. The conferencer then processes the SMDAT signal(s) in the previously described manner. However, if an error exists in either of the input message samples to be added or in the sum data, during a given time slot, the $P_{ACT}$ does not equal $P_{EXP}$ and an error indication is sent to the control circuit 1500. In response to this error indication, the control circuit 1500 prevents the sum data of this particular time slot from being stored in accumulator RAM 510 or 520.

The out-adder 640 performs a subtraction function, but, as previously explained, this is a binary arithmetic operation which can be monitored in accordance with the invention. The difference data (DFDAT) from the adder 640 is delivered to output control 1800 and to the parity processing circuit 32. Concurrently therewith, the carries from the arithmetic operation are also delivered to the parity processing circuits 32 along with the parities of the input data words to adder 640. As in the case with adder 310, the parity bits are merely passed through the adder 640 to the parity circuits 32. The parity detection operation here is the same and the conferencer handles the signals in the described manner in the absence of error. However, when an error is found to eixst ($P_{ACT} \neq P_{EXP}$) an error indication is delivered to the output control circuit 1800, which in response thereto "mutes" the output 750 for the particular time slot in error.

The utility of the present invention in a digital conferencing system has been disclosed with respect to the input and output adders 310 and 640. However, it will be evident to those skilled in the art that the invention has general applicability to any signal processing in a digital conferencer which utilizes a binary arithmetic operation.

DETAILED DESCRIPTION OF FIGS. 5 AND 6 CIRCUIT

Figure 4:
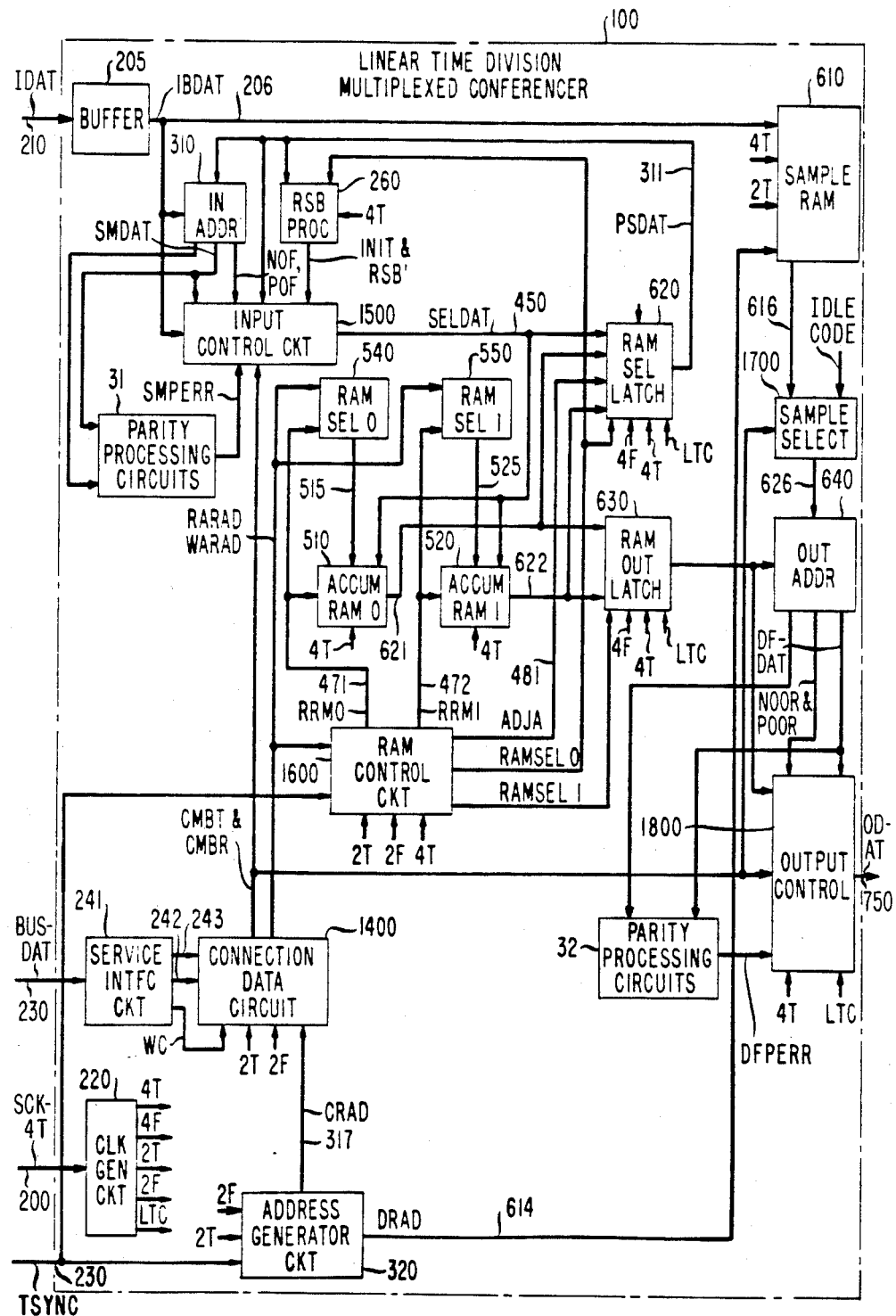
Figure 5:
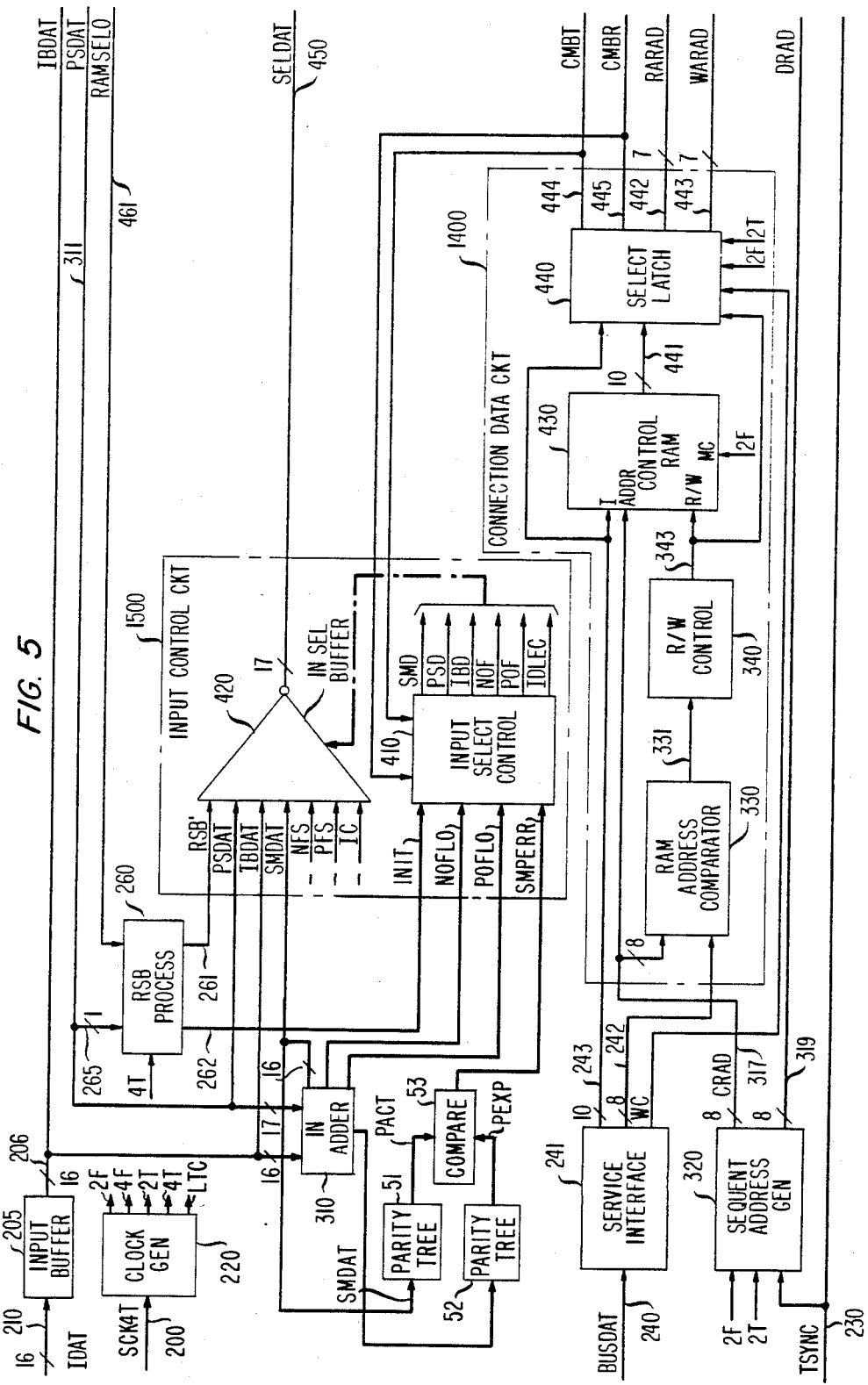
Figure 6:
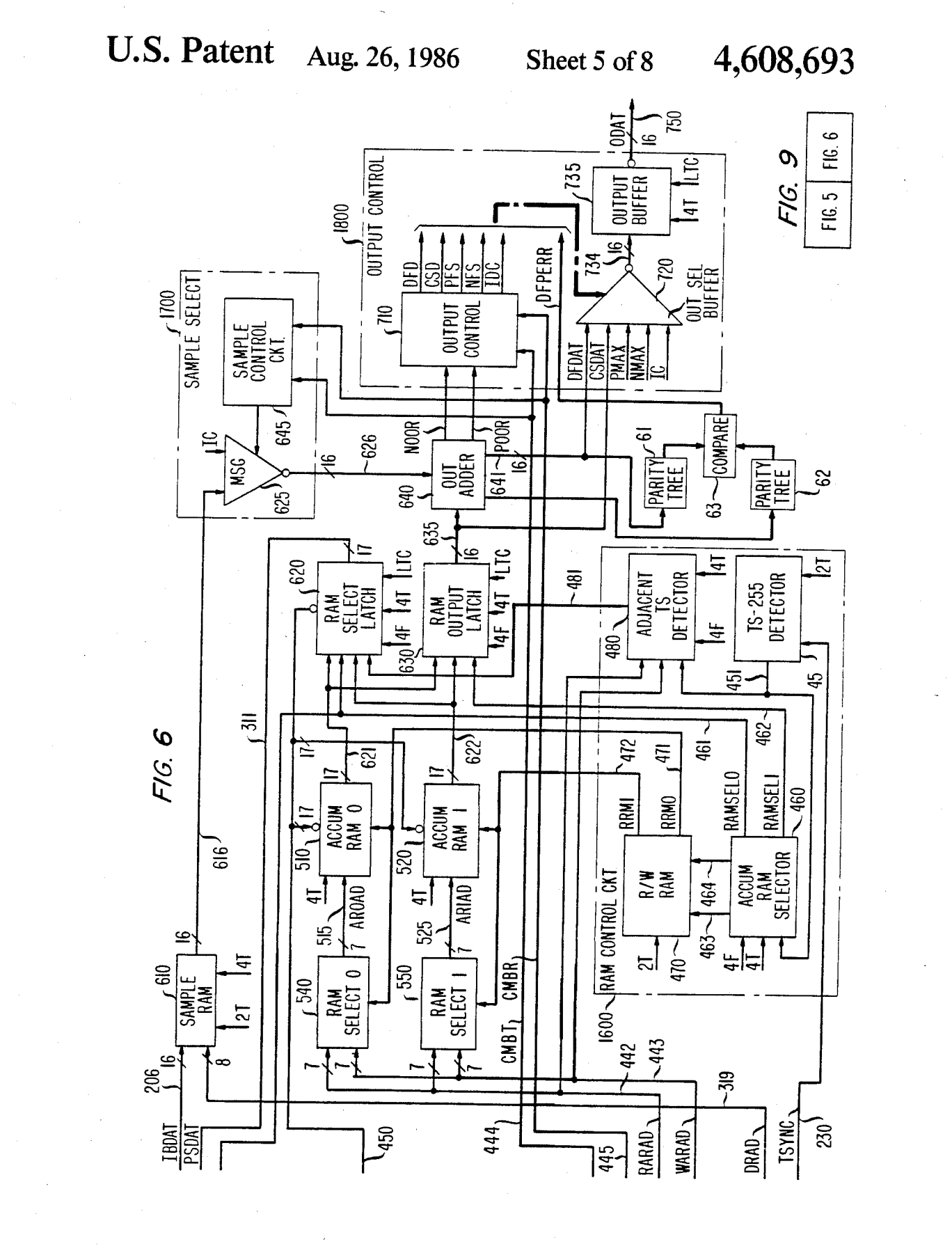

Drawings FIGS. 5 and 6, when arranged with respect to each other as shown in FIG. 9, illustrate how the various elements of the conferencer cooperate to provide a linear time division multiplexed conferencing network. The various circuit elements are oriented with respect with each other in FIGS. 5 and 6 in a manner analogous to that of FIG. 4.

Referring to FIGS. 5 and 6, a digital input time frame having n time slots supplies at input 210 (FIG. 5) a parallel input of linearly encoded data or voice samples in two's complement format for processing by the conferencer. Thereafter, in accordance with an assigned connection mode, a time slot assigned to a connection is extended to output data bus 750 (FIG. 6).

A time frame is typically the 125 microsecond Bell System T1 carrier frame, and herein a time frame will be assumed to be 125 microseconds represented by a frame sync signal (TSYNC of FIG. 7) externally supplied via lead 230 (FIG. 5). It is also assumed that an approximately 4.096 megahertz clock signal (SCK4T) is externally supplied to clock generator 220 via lead 200 and outputted via lead 4T for operating the input and output paths synchronously with one clock signal and for division into a 2 MHz clock signal 2T (FIG. 7) outputted via lead 2T. Clock generator 220 also supplies a second 2 MHz clock signal 2F (FIG. 7) outputted via lead 2F which is an inverted non-overlapping replica of signal 2T, and a second 4 MHz clock signal 4F outputted via lead 4F which is an inverted non-overlapping replica of clock signal 4T. Clock generator 220 further supplies a third 2 MHz clock signal LTC outputted via lead LTC having a logic one state which overlaps the last quarter and first quarter of adjacent time slots to form a clock window. Clock signal LTC enables, during the window, new data to be set up on the "D" inputs to latch circuits 620, 630 and 735 (FIG. 6) in order to update the respective latch on the next rising edge of clock signal 4T occurring within the LTC window, as will be discussed.

ADDRESS COUNTER

Sequential address generator 320 (FIG. 5) in response to the falling edge of clock signal 2T generates an eight bit time slot addresses (CRAD), representing time slots 0 through 255, for addressing control RAM 430 over address bus 317. In response to the rising edge of clock signal 2T, address generator 320 generates time slot addresses (DRAD) 0 through 255 for addressing sample memory 610 (FIG. 6). TSYNC is the means in which the counters are synchronized with respect to incoming time slots (IBDAT).

Figure 7:
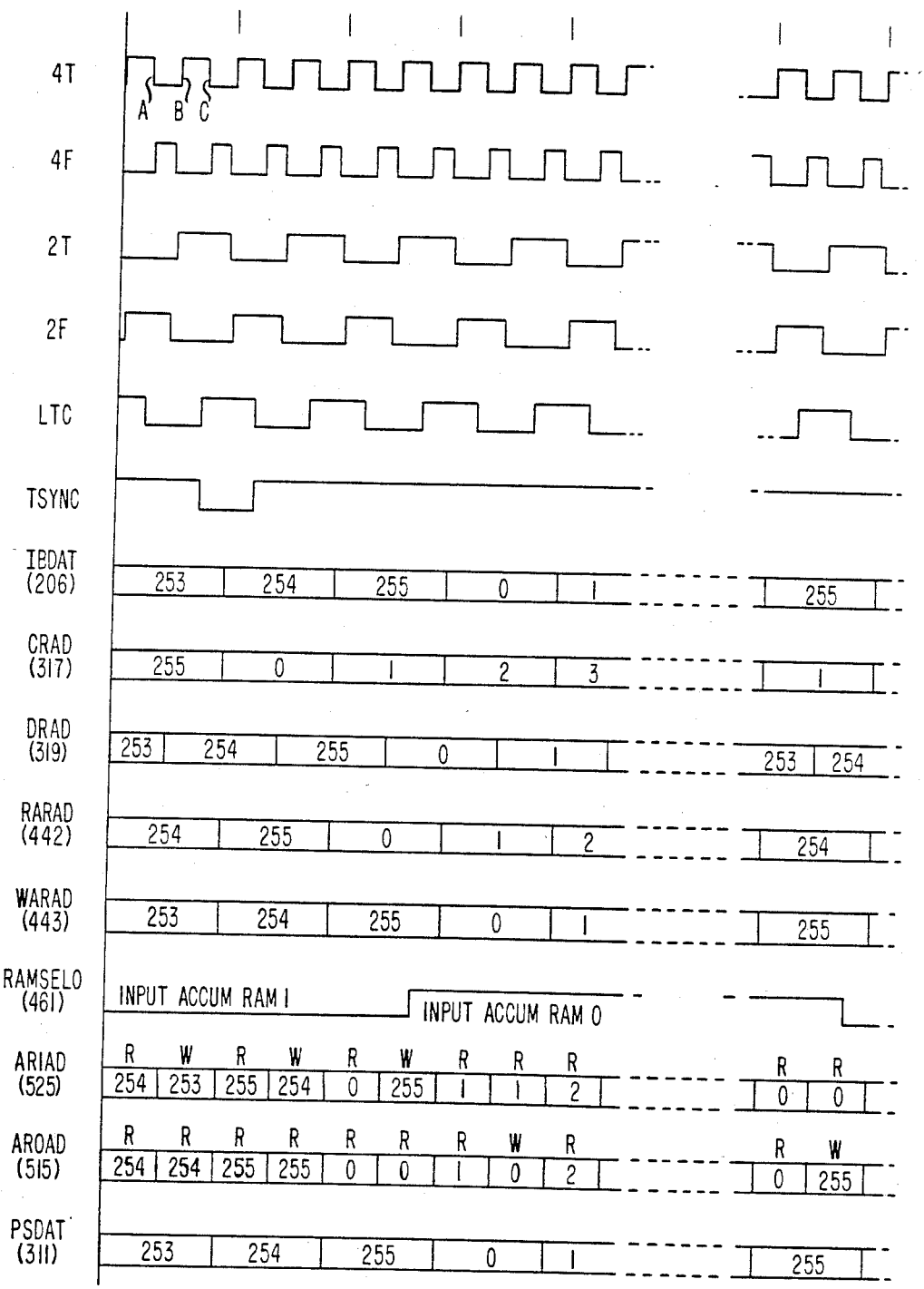

Briefly referring to FIG. 7, there is shown a timing representation of time slot addresses CRAD and DRAD in which time slot address DRAD leads (starts before) incoming time slot associated with input data bus IBDAT by one-half time slot and time slot address CRAD leads incoming time slot IBDAT by two time slots. This sequence permits prefetching message samples from sample RAM 610 and accumulator RAM 510 (520) as will become more apparent further on in the detailed description.

CONTROL RAM

Returning to FIG. 5, control RAM 430 has 256 memory locations respective to incoming time slots. Time slot addresses (CRAD) sequentially generated by address generator 320 are extended to the address input of control RAM 430 over address bus 317. Control RAM 430 is the means by which selected incoming time slots from input buffer 205 are connected to output time slots at output 750. In this respect, each time slot participating in a conference connection is assigned (externally) the same memory location in accumulator RAM 510, or in accumulator RAM 520 (FIG. 6). The accumulator RAM 510 (520) memory location address assigned to a connection, mode control bits CMBT and CMBR, plus a parity bit are stored in control RAM 430 (FIG. 5) for each respective time slot of a conference connection.

The correspondence between time slot addresses and accumulator RAM 510, 520 memory locations is made external to the conferencer by a central processing unit (not shown). For example, assume that a two party call is comprised of time slots 8 and 15 respectively, and further assume that accumulator RAM 510 (520) memory location address 20 is assigned to the connection. To control the processing of the connection by the conferencer, a seven bit binary representation of address 20, plus two mode control bits, plus a parity bit is stored in memory location 8 and memory location 15 of control RAM 430.

The external central processing unit would serially transmit the connection control data, plus time slot address to service interface circuit 241 via BUSDAT lead 240 under the control of a bus synchronization pulse (not shown). Interface circuit 241 is a latched serial-to-parallel converter circuit, which extends the time slot address to address comparator circuit 330 via bus 242 and extends connection control data to control RAM 430 via bus 243.

Interface circuit 241 also includes a decoder circuit for decoding a multibit operation code appended to connection data received via lead 240. The operation code specifies whether the data sent via lead 240 is to be stored in control RAM 430 (new connection data) or is to be used for auditing or maintenance purposes (maintenance data, not shown). Service interface circuit 241 upon decoding an operation code that specifies a write to control RAM 430 changes the logic state of the wc lead to select latch 440 from a logic zero to a logic one. The logic one state extends new conference information to processing circuitry while the respective control RAM 430 memory location is being updated, as will be discussed shortly.

Address comparator circuit 330 compares the time slot address on bus 242 against time slot address CRAD (Control RAM ADdress) contained on bus 317. When the time slot addresses on bus 242 and bus 317 compare, address comparator 330 causes R/W control circuit 340 via lead 331 to switch control RAM 430 from the read state to the write state via lead 343. On the falling edge of clock pulse 2F the connection control data on bus 243 is caused to be written into control RAM 430 respective to the time slot address on address bus 317.

With respect to the above example, in which time slots 8 and 15 were assigned accumulator RAM 510 (520) memory location 20, the external central processing unit establishes connection control as follows: first, time slot address 8 and accumulator RAM 510 (520) address 20, together with the mode control bits and a parity bit are serially transmitted by an external processor over lead 240 for acceptance by interface circuit 241. Interface circuit 241 converts the data to a first parallel output on bus 242 (time slot address) and a second parallel output on bus 243 (accumulator RAM address 20, mode bits plus parity); second, when address counter 320 generates time slot address 8, the R/W control circuit 340 in response to comparator circuit 330 causes the connection control data on bus 243 to be written into address 8 of control RAM 430 on the falling edge of the 2F pulse; third, the same procedure is then executed for time slot 15 completing the sequence for establishing conference connection data for the connection.

As discussed above, the connection control data stored in control RAM 430 for each time slot of a connection includes: the address of a location in accumulator RAM 510 (520) assigned to the connection; two mode control bits and a parity bit. In the illustrative embodiment disclosed herein, it is assumed that the two mode control bits, CMBT and CMBR, are in accordance with the following table definitions:

TABLE 1

| CMBR | CMBT | FUNCTION |
| --- | --- | --- |
| 0 | 0 | Data Connection |
| 0 | 1 | Broadcast Connection |
| 1 | 0 | Monitor Connection |
| 1 | 1 | Conference Connection |

In accordance with the definitions described by Table 1, mode control bit CMBT set to the logic one state declares a broadcast or transmit connection in which a time slot has permission to transmit messages to a conference connection. Mode control bit CMBR set to the logic one state declares a monitor or receive connection in which a time slot has permission to receive messages from a conference connection.

A single mode control bit set to logic zero prevents a time slot from having access to the respective function. For example, if the state of the mode control bits is 01 for a respective time slot, then that time slot can only broadcast to the remainder of the connection. When both mode control bits are set to logic one (11) a respective time slot has permission to both broadcast and receive messages from the connections. The default state of mode control (00) can be reserved for a special type of connection.

Returning to FIGS. 5 and 6, control memory RAM 430 is normally held in the read state by the R/W control circuit 340 via lead 343. Sequential time slot addresses (CRAD) for accessing respective locations of control RAM 430 are generated by address generator 320 in response to each falling edge of the 2T clock signal and are outputted via bus 317.

On the falling edge of the 2F clock signal, the eight bit time slot address (CRAD) applied to the address input of control RAM 430 via bus 317 is internally latched by control RAM 430 and a memory location represented by time slot address CRAD is read. The contents are latched into control RAM 430 output latch (internal) on the following rising edge of 2F (not shown). The connection control data respective to a time slot is passed from control RAM 430 to select latch circuit 440 via data bus 441.

SELECT LATCH

Select latch 440 is a selector followed by a two stage dynamic register of D-type flip-flops and includes a ten bit selector for selecting data from either data bus 343 or data bus 441. During normal processing select latch 440 accepts data from bus 441. Otherwise, data is accepted from bus 243 upon initialization of a time slot via service interface circuit 241.

As discussed above, during initialization of a time slot the decoder circuit of service interface circuit 241 causes the wc lead connected to select latch 440 to go to a logic one state indicating a write to control RAM 430. Also, a comparison of address CRAD and the address of the initialized time slot address on bus 242 forces lead 343 from r/w control 340 to a logic zero state. The coincidence of a logic one state on the wc lead and a logic zero state on lead 343, both of which connect select latch 440, is reclocked by select latch 440 on the next rising edge of the 2F clock forming a window to allow select latch 440 to select data from bus 243. The new connection on bus 243 comprises a seven bit accumulator RAM address and two mode bits (and parity). Select latch 440 extends the accumulator RAM address to RARAD address bus 442 and extends both the accumulator RAM address and mode bits (and parity) to the first stage of the two stage dynamic register. The data is clocked into the first stage of the two dynamic register 440 on the rising edge of the 2T clock, which occurs during the middle of the respective time slot. Thereafter the ten bits of connection data is clocked into the second stage of the two-stage dynamic register on the rising edge of the 2F clock.

In this manner, new connection data respective to an initialized time slot assigned to a connection is stored in control RAM 430, and simultaneously therewith, is accepted by select latch 440 for immediate use by the conferencer. Otherwise, the conferencer's access to the new connection data would be delayed one time frame.

For processing message samples, select latch 440 holds in its second or output register the accumulator RAM 510 (520) connection write address (WARAD) on bus 443 and mode control bits on leads 444 and 445 respective to a particular time slot and, simultaneously therewith, holds accumulator RAM 510 (520) connection read address (RARAD), outputted from control RAM 430 via bus 441, on bus 442 respective to a next time slot. Using this approach, a summed message sample respective to a second time slot is prefetched prior to storing a summed message sample respective to a first time slot in accumulator RAM 510 (520).

The accumulator RAM 510 (520) address portion of the connection control data presented to select latch 440 via bus 441 is first outputted by select latch 440 as accumulator RAM 510 (520) read address (RARAD) on bus 442. Thereafter, on the rising edge of clock signal 2F the connection control data outputted from control RAM 430 via bus 441 is clocked into select latch 440 and held in the second register stage of select latch 440. The connection control data is then outputted by the second register stage of select latch 440 as an accumulator RAM 510 (520) write address (WARAD) on bus 443. Mode control bits, CMBT and CMBR, are outputted on leads 444 and 445 respectively.

INPUT SELECT BUFFER

Input select buffer 420 (FIG. 5) is a combinational gate circuit for checking parity (not shown) and for selecting, under control of input control circuit 410, one of a multiple of alternate digital words for storage in accumulator RAM 510 (520). Inputs PSDAT, IBDAT and SMDAT are defined, respectively as, previously summed message samples removed from accumulator RAM 510 (520); inputted message sample at 206 respective to an incoming time slot; and the sum of PSDAT and IBDAT generated by in-adder 310. Alternate digital messages PFS, NFS and IDLECODE (IC) are fixed codes that are hard wired internally at input select buffer 420 and are selected at the direction of input selector control 410 for storage in accumulator RAM 510 (520). PFS is a digital two's complement representation of the maximum positive value including sign of a summed message sample, NFS is a digital two's complement representation of the maximum negative value including sign of a summed message sample, and IDLECODE (IC) represents a two's complement digital message sample of zero value.

Input select buffer 420 also includes combinatorial logic circuitry for appending (upon initialization) or changing the state of bit 16 (reset bit) of outputted data to SELDAT bus 450 for storage in accumulator RAM 510 (520). The function of the reset bit RSB' will be detailed further on in this description.

IN-ADDER

In-adder 310 is a twos-complement combinatorial circuit adder for summing incoming message samples (IBDAT) inputted via bus 206 with accumulator RAM 510 (520) previously summed message samples (PSDAT) outputted from select latch 620 via PSDAT bus 311 to in-adder 310. In-adder 310 includes combinational saturation logic circuitry for checking a summation for positive or negative overflow in the well-known manner, and includes combinational circuitry for performing circuit maintenance functions (not shown) at the direction of an external central processing unit (not shown).

INPUT CONTROL

Input select control 410 is alerted by in-adder 310 via either lead POFLO or lead NOFLO in the event the saturation logic circuitry contained in in-adder 310 detects a positive overflow or negative overflow resulting from a summation of message samples. Input select control circuit 410 in response to an active POFLO or NOFLO lead from in-adder 310 directs input select buffer 420, via leads POF or NOF, to select either hard wired digital message PFS or digital message NFS respective to the overflow condition for outputting to bus 450. In this manner, an excessive summed message sample is clamped to an established maximum positive (PFS) or maximum negative (NFS) value prior to storage in accumulator RAM 510 (520).

Mode control bits, CMBT and CMBR, extend from select latch 440 to input select control 410 over leads 444 and 445 respectively for controlling input functions at input select buffer 420 in accordance with the permissions detailed in Table 1.

A weighted binary value of zero-one (01) (broadcast) or one-one (11) (conference) for mode control bits CMBR and CMBT cause the input control circuit 410 to permit, via lead SMD, the summed message sample (SMDAT) from in-adder 310 to be gated through input buffer select circuit 420 to SELDAT data bus 450. This sequence is in accordance with the function of the mode bits since a time slot which is permitted to broadcast has its message sample summed with the message sample contributed by the remaining time slots assigned to the connection.

A time slot which has permission only to monitor a conference connection (CMBR and CMBT=01 respectively) causes input select control 410 to permit via lead PSD previously summed message samples (PSDAT) to be gated through the input select buffer 420 to SELDAT data bus 450. This sequence is in accordance with Table 1 since a time slot having permission only to monitor a conference session is denied permission to transmit to the section.

In the event a time slot has permission only to monitor a conference session, and that time slot is the first time slot of a connection to access accumulator RAM 510 (520) during a time frame, then select control circuit 410 in response to the INIT lead extended from RSB circuit 260 permits, via lead IDLEC, symbolic input IDLECODE (IC), which has a digital value of zero, to be gated through input buffer select circuit 420 to SELDAT data bus 450, rather than PSDAT. This sequence is in accordance with the monitor function since the accumulator RAM 510 (520) memory location assigned to the connection is initialized by loading the message sample from the first accessing time slot, which, for a time slot in the monitor mode is a digital message sample of zero value, into the assigned accumulator RAM 510 (520) memory location. In the event a first accessing time slot has permission to broadcast then IBDAT is selected for outputting to bus 450 via lead IBD from select circuit 410 to buffer circuit 420.

TABLE 2

| Select Control 410 Input | | | | | Output to Bus 450 |
|---|---|---|---|---|---|
| CMBR | CMBT | INIT | POFLO | NOFLO | OUTPUT |
| 0 | 0 | 1 | — | — | IBDAT |
| 0 | 1 | 1 | — | — | IBDAT |
| 1 | 0 | 1 | — | — | IDLECODE |
| 1 | 1 | 1 | — | — | IBDAT |
| 0 | 0 | 0 | 0 | 0 | SMDAT |
| 0 | 1 | 0 | 0 | 0 | SMDAT |
| 1 | 0 | 0 | 0 | 0 | PSDAT |
| 1 | 1 | 0 | 0 | 0 | SMDAT |
| 0 | 0 | 0 | 1 | 0 | PFS |
| 0 | 1 | 0 | 1 | 0 | PFS |
| 1 | 0 | 0 | 1 | 0 | PSDAT |
| 1 | 1 | 0 | 1 | 0 | PFS |
| 0 | 0 | 0 | 0 | 1 | NFS |
| 1 | 0 | 0 | 0 | 1 | PSDAT |
| 1 | 1 | 0 | 0 | 1 | NFS |
| 0 | 1 | 0 | 0 | 1 | NFS |

Table 2 illustrates symbolically, in a format similar to the format of the well-known truth table, the states of inputs to select control 410 that control the selection of corresponding ones of digital inputs to input select buffer 420 for gating to SELDAT bus 450.

RESET BIT PROCESSING

Input select buffer 420 appends or changes the reset bit (bit 16) of the seventeen bits of data outputted to bus 450 prior to storage in accumulator RAM 510 (520). The reset bit (bit 16) of a summed message sample is the means by which the first storage access to accumulator RAM 510 (520) is recognized respective to a conference session.

Figure 8:
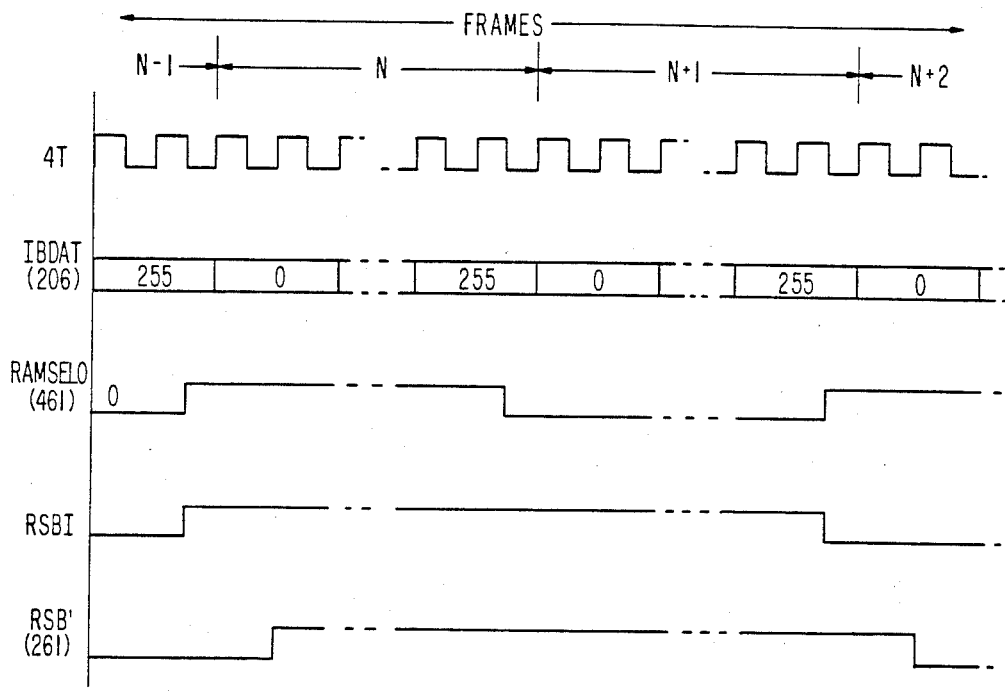

RSB processor circuit 260 is a sequential logic circuit of edge triggered flip-flops for generating reference signal RSB' on lead 261. FIG. 8 shows a symbolic representation of incoming time slots 255 and 0 occurring within three consecutive time frames N, N+1, N+2. FIG. 8 also shows signal RAMSEL0 which is clocked by the second rising edge of clock signal 4F during the fourth quarter of time slot 255. The generation of RAMSEL0 will be detailed further on in this description. FIG. 8 further shows signal RSBI which is internal to RSB processor 260 and which is clocked on the rising edge of clock signal RAMSEL0. Signal RSBI is effectively one-half the frequency of signal RAMSEL0. Signal RSB' is a delayed replica of internal reference signal RSBI and is reclocked in the middle of time slot 0. Signal RSB' is delayed in this manner to ensure that its application by input select buffer 420 occurs sufficiently after the occurrence of time slot 255 so as not to disturb the state of the reset bit during time slot 255.

Returning to FIGS. 5 and 6, RSB processor 260 includes circuitry for comparing the logic state of signal RSB' against bit 16 (Reset bit) inputted via lead 265 for each summed message sample placed on PSDAT data bus 311 via accumulator RAM 510 (520) and select latch 620.

Referring to FIG. 8, it is noticed that the logic state of signal RSB' changes every two time frames (N, N+2) during time slot zero. The frequency of signal RSB ensures that the reset bit (bit 16) of each summed message sample stored in accumulator RAM 510 (520) tracks the logic state of RSB for two time frames since the accumulators 510 and 520 are alternately loaded between a first and second time frame. Therefore, for time frames N and N+1 (FIG. 8) the reset bit of each summed message sample stored in accumulators 510 and 520 correspond to the logic state of signal RSB' during the respective time frames.

During time frame N+2 (FIG. 8) reset signal RSB' is toggled to the logic zero state during time slot zero and remains in that state during time frames N+2 and N+3 (not shown).

To reiterate, bit 16 (reset bit) of each summed message sample processed during time frames N and N+1 were set to a logic one corresponding to the state of signal RSB'. The reset bit and summed samples are stored in the accumulator. During time frame N+2, bit 16 of each stored summed message sample (PSDAT) is compared by RSB processor 260 against signal RSB'. If the logic state of bit 16 of a respective summed message sample and the logic state of signal RSB' do not compare then the respective time slot must be the first access to accumulator RAM 510 (520) for the respective connection. This follows, since if a prior access for this frame had occurred the stored reset bit would match signal RSB'. RSB processor 260, upon detecting a first access to accumulator RAM 510 (520), causes the INIT lead to input select control 410 to go to the logic one state. In turn, input select control 410, in accordance with Table 2, selects IBDAT or IDLECODE to be gated through input select buffer 420 for storage in accumulator RAM 510 (520) along with RSB' (bit 16). In this manner, a new input message IBDAT respective to the first accessing time slot or IDLECODE (monitor mode) is used to reset the respective assigned accumulator RAM 510 (520) memory location thereby avoiding the necessity of pausing at the beginning of each time frame in order to clear accumulator RAM 510 (520).

If the logic state of bit 16 at 265 of a summed message sample respective to a connection and the logic state of signal RSB' compare then the respective time slot is not the first access in this frame to accumulator RAM 510 (520). In this event, the logic state of the INIT lead is zero and the output from input select buffer 420, under control of input select 420, will be in accordance with Table 2.

By way of example and referring to FIG. 8, assume that a conference connection comprising three telephone lines are assigned by an external central processing unit to time slots 0, 4 and 8 (4 and 8 not shown) respectively. Also assume that the conference connection is assigned memory location 96 of accumulator RAM 510 (520) for the storage of the connection's summed message samples. Further assume that accumulator RAM 510 is accessed for storage during even time frames (N, N+2), and that accumulator RAM 520 is accessed for storage during odd time frames (N−1, N+1). Also, assume that bit 16 (reset bit) of each summed message samples stored in accumulator RAMs 510 and 520 during time frames N−2 (not shown) and N−2 were set to logic zero corresponding to the state of signal RSB'.

Figure 10:
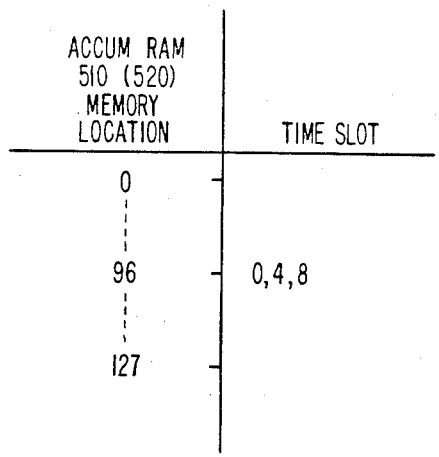

In accordance with the outlined assumptions, and with reference to FIGS. 8 and 10, during time slot 255 of time frame N−1 (which precedes time slot 0) the summed message samples priorly loaded into location 96 of even accumulator RAM 510 during time frame N−2 (not shown) is prefetched and presented to latch 620 (FIG. 6). At the beginning of time slot 0 of frame N, latch 620 is caused to output the summed message sample to PSDAT bus for summation by in-adder 310 with an incoming message sample (IBDAT) respective to time slot 0. Also, during time frame N, reference signal RSB' is toggled as priorly discussed to logic one state. As noted previously, the toggling of the RSB' signal is delayed to ensure its input at select buffer 420 occurs correctly (i.e., is toggled within a corresponding current frame). Reset bit (bit 16) of a respective summed message sample on PSDAT bus is extended to RSB processor 260 via lead 265 for comparison with reference signal RSB. Since the logic state of bit 16 is zero (0) and the logic state of signal RSB' is a one (1) there is a mismatch signifying a first access to memory location 96 of accumulator RAM 510 during time frame N.

The INIT lead to input select control 410 from RSB processor 260 goes to a logic one state as a result of the mismatch and directs either inputted message sample IBDAT or symbolic input IDLECODE to be gated through input select buffer 420 to SELDAT bus 450 for storage in location 96 of accumulator RAM 510 thereby overwriting old data with new data. The reset bit (bit 16) of selected ones of inputs to input select buffer 420 is updated by input buffer 420 circuitry to correspond to the current logic state of signal RSB before outputting to bus 450. In this manner, the reset bit equals signal RSB' after initial access has been recognized by RSB processor 260.

During time slot 3 of frame N the contents of location 96 of accumulator RAM 510 is again prefetched and presented to latch 620. At the beginning of time slot 4 the contents of latch 620 is outputted to PSDAT bus for summation with an incoming message sample respective to time slot 4 by in-adder 310. Bit 16 of PSDAT bus is sampled by RSB processor 260 via lead 265 for comparison against signal RSB'. However, RSB processor 260 in this instance does not detect a mismatch since bit 16 of the summed message sample was changed during time slot 0 by input select control 410 to equal signal RSB'. As such, time slot 4 is not recognized as a first access and the summed message sample SMDAT from in-adder 310 is gated through input select buffer 420 for outputting to bus 450 for storage into location 96 of accumulator RAM 510. The recognition process that was applied to time slot 4 is also applied to time slot 8.

During the next time frame N+1, time slot 0 is recognized as the first access to location 96 of odd accumulator RAM 520.

The recognition of time slot 0 as the first access to location 96 of accumulator RAM 520 is based on the status of bit 16 of the summed message sample stored in location 96. The last access to accumulator RAM 520 occurred during time frame N−1 in which the state of signal RSB' was zero. As noted previously, input select buffer 420 (FIG. 5) changes bit 16 to equal the state of signal RSB', which during time slot N−1 was a logic zero. Therefore, RSB processor 260 upon comparing bit 16 of the summed message sample stored in location 96 of accumulator RAM 520 against the state of signal RSB' detects a mismatch. The mismatch, as noted previously, signifies a first access. The processing of time slot zero includes changing bit 16 of summed message sample to correspond to signal RSB' to preclude recognizing time slot 4 and 8 as a first access during the N+1 time frame in the manner described above.

ACCUMULATOR RAM

Referring to FIG. 6, accumulator RAM 510 and RAM 520 are identical dynamic random access memories each having 128 memory locations by seventeen bits enabled by 4T clock signals. Summed message samples stored in accumulator RAM 510 (520) memory locations comprise 17 bits as follows: a summed message sample of 14 magnitude bits and a sign bit, a parity bit and a reset bit.

FIG. 7 shows four transitions of clock 4T for each period of a time slot. The first falling edge of clock 4T (A) initiates an accumulator RAM 520 (510) read or prefetch. During the next (first) rising edge (B) of the 4T clock signal the prefetched data is clocked into accumulator RAM 520 (510) output register (internal, not shown). During the second falling edge (C) of the 4T clock signal a summed message sample from PSDAT bus 311 is written into accumulator RAM 520 (510). This sequence is depicted by the AR1AD accumulator RAM 520 address sequence (FIG. 7) respective to time slot 253, which shows that a time slot is divided into two distinct operations, namely, first, prefetching summed message samples respective to a second time slot (254) and second, storing a summed message sample respective to a first time slot (253) during the period in which RAMSEL0 is a logic zero.

TS-255 (TIME SLOT) DETECTOR

TS-255 Detector 455 FIG. 6 is a circuit arranged for detecting the occurrence of incoming time slot 255 respective to system frame sync signal TSYNC (FIG. 7), which occurs once each time frame and which overlaps time slots 253 and 254 as a means of signifying an approaching end to a respective time frame. Signal TSYNC applied via lead 230 is toggled and clocked into the first D-type flip-flop of detector 455 on the falling edge of clock signal 2T occurring at the end of time slot 253. TSYNC is then clocked into a second D-type flip-flop of TS detector 455 on the falling edge of clock signal 2T occurring at the beginning of IBDAT time slot 255 and is outputted as signal TS255' on lead 451. Signal TS255' on lead 451 is time representative of incoming time slot 255.

RAM SELECTOR

Accumulator RAM 510 (520) selector circuit 460 is a sequential circuit for generating clock signal RAMSEL0 at lead 461 and clock signal LRS0 at lead 463. Clock signals RAMSEL1 and LRS1 at lead 462 and lead 464 respectively are complements of signals RAMSEL0 and LRS0 respectively.

Clock signals RAMSEL0 and RAMSEL1 at lead 461 and 462 respectively are the means for alternating accumulator RAM 510 (520) between a storage cycle during a first time frame and a supply cycle during a second time frame. Derivative RAM select signal LRS0 outputted at lead 463 to RAM r/w circuit 470 and at a logic one state (high) during a first time frame selects accumulator RAM 510 for storage of summed message samples outputted from input select buffer 420 via SELDAT bus 450. RAM select signal LRS0 at the logic zero state selects accumulator RAM 510 for supplying summed message samples for outputting via data bus 750. RAM select signal LRS1 outputted at lead 464 to RAM r/w circuit 470 and at the logic one state selects accumulator RAM 520 for the storage of message samples and at the logic zero state selects accumulator RAM 520 for supplying summed message samples to lead 750.

Clock signal RAMSEL0 at lead 461 is toggled by the occurrence of signal TS255' extended from TS-255 detector 455 via lead 451, and the second rising edge of clock signal 4F occurring during time slot 255. In turn, control signal LRS0 is delayed one-quarter of a time slot respective to signal RAMSEL0 and is toggled by the combination of toggled RAMSEL0 and the first rising edge of clock signal 4T. Toggled select signal LRS0 occurs at the start of a time frame coincident with time slot 0. Select signals LRS0 and LRS1 are toggled in this manner following the occurrence of each TSYNC pulse as a means of causing the signals to alternate between a logic one state and logic zero state respectively during a first time frame and a logic zero and logic one state respectively during a second time frame for the alternate selection of accumulator RAM 510 (520).

RAM READ/WRITE

Referring to FIG. 7, in particular to time sequence AR1AD, it is shown that each time slot is apportioned into a read (R) cycle for first prefetching a summed message sample respective to a second time slot and a write cycle for storing summed message samples into accumulator RAM 520 respective to a first time slot. Signals RRM0 and RRM1 are the means by which a time slot is apportioned into a read cycle and a write cycle.

Returning to FIG. 6, RAM READ/WRITE circuit 470 is a combinational circuit comprised of AND and NAND gates for generating accumulator RAM 510 (520) READ/WRITE signals RRM0 and RRM1 at leads 471 and 472 respectively. Signals RRM0 and RRM1 at leads 471 and 472 respectively are inverted replicas of clock signal 2T for the accumulator RAM 510 (520) in the storage cycle. Select signal LRS0 (LRS1) at the logic zero state and inputted via lead 463 (464) disenables circuitry associated with RAM read/write circuit 470 and forces the output at lead 471 (472) to a logic one state, or RAM read state for the accumulator RAM 510 (520) in the supply cycle. Conversely, select signal LRS0 (LRS1) at the logic one state enables RAM read/write circuitry 470 thereby causing the circuitry to output at lead 471 (472) an inverted replica of clock signal 2T. Since select signals LRS0 and LRS1 are logical complements, either signal RRM0 or signal RRM1, but not both, is enabled during a respective time frame. Read/Write control signals RRM0 and RRM1 also connect to accumulator RAM 510 (520) via leads 471 and 472 respectively.

The seven bit accumulator RAM 510 (520) read address (RARAD) and write address (WARAD) extend to accumulator RAM 510 (520) via address bus 515 (525) and via select circuits RS0 and RS1, 540, 550 respectively, which are under the control of signals RRM0 and RRM1.

For example, assume that during a first time frame accumulator RAM 520 is operative for the storage of message samples inputted via SELDAT bus and, concurrently, accumulator RAM 510 is operative for outputting message samples stored during the prior frame respective to each time slot to output 750. In this instance, RRM1, which during the assumed first time frame is an inverted replica of clock 2T, gates read address RARAD through select circuit 550 to accumulator RAM 520 via address bus 525 during the first half of a time slot and gates write address WARAD, via address bus 525, to accumulator RAM 520 during the second half of a time slot. Simultaneously therewith, signal RRM0, which is held constantly at logic 1 during the assumed time frame, gates only read address RARAD through select circuit 540 to accumulator RAM 510 via address bus 515 during the respective time frame.

During the second (next) time frame, signal RRM1 at lead 472 is held at the logic one state for the entire time frame thereby only allowing read address RARAD to be gated through select circuit 550 to accumulator RAM 520 via address bus 525. Concurrently, enabled signal RRM0, having a logic one state during the first half of a time slot and a logic zero state during the second half of a time slot, gates read address RARAD through select circuit 540 during the first half of a time slot and gates through WARAD to accumulator RAM 510 during the second half of the time slot. In this manner each accumulator RAM 510 (520) alternates between a storage cycle and a supply cycle, and permits prefetching a summed message sample respective to a second time slot during a first time slot.

RAM SELECT LATCH

RAM select latch 620 FIG. 6 is a seventeen bit array of master-slave D type flip-flops for holding prefetched previously summed message samples outputted from accumulator RAM 510 (520) for summing with a respective incoming message sample (IBDAT) by inadder 310. RAM select latch 620 alternates under control of the RAMSEL0 clock between receiving summed message samples from accumulator RAM 510 (520). A summed message sample is clocked into the master flip-flops of latch 620 on the second rising edge of the 4F clock and then clocked into the slave flip-flops for outputting to PSDAT data bus 311 on the rising edge of the 4T clock signal during the period in which clock signal LTC is a logic one.

Referring to FIG. 6, RAM select latch 620 receives and latches via data bus 621 summed message samples from accumulator RAM 510 when the RAMSEL0 lead 461 is a logic one and receives and holds via data bus 622 summed message samples from accumulator RAM 520 when RAMSEL0 lead 461 is a logic zero. A summed message sample stored in select latch 620 is presented both to in-adder 310 via bus 311 for summing with an incoming message sample (IBDAT) on bus 206, and to input select buffer 420 as discussed previously.

ADJACENT TIME SLOTS

For the occurrence in which adjacent time slots within a time frame are assigned to the same conference, and, therefore, both are assigned the same accumulator RAM 510 (520) memory location, the summed message samples outputted from input buffer 420 respective to a first one of the adjacent time slots is caused to be loaded by the adjacent time slot detector 480 into select latch 620 in addition to being loaded in accumulator RAM 510 (520). In this manner the summed message samples prefetched in preparation of processing the second one of the adjacent time slots includes the message sample contributed by the first one of the adjacent time slots. Without this arrangement the prefetched sum which is removed from memory during the prior time slot would not include the latest sample contributed by the prior time slot.

Referring to FIG. 6, adjacent time slot detector 480 is a combinational comparator circuit and register circuit for detecting adjacent time slots assigned to the same conference session. Adjacent time slot detector 480 is disabled by signal TS255 which is time representative of incoming time slot 255, inputted via lead 451 from detector 455. Disablement of detector 480 precludes recognition of adjacent time slots across the boundaries of two adjacent time frames, which is the case for time slot 255 and time slot 0.

As discussed previously, accumulator RAM 510 (520) read (prefetch) address RARAD respective to a second time slot occurs simultaneously with accumulator RAM 510 (520) write address WARAD at the output of select latch 440 or address busses 442 and 443, respectively. Therefore, read address (RARAD) respective to a second one of adjacent time slots equals the write address (WARAD) respective to a first one of adjacent time slots occurring simultaneously therewith.

Read address RARAD and write address WARAD extend from select latch 440 to adjacent time slot detector 480 via address busses 442 and 443 respectively. Combinational comparator circuitry associated with detector 480 compares the addresses and outputs a logic one via lead 481 upon detecting a match between addresses RARAD and WARAD. At the beginning of the fourth quarter of the first one of adjacent time slots, the logic one outputted from the comparator circuitry of detector 480 is clocked into a detector 480 output register on the rising edge of clock signal 4F and outputted at 481. Detector 480 output register is cleared by the rising edge of clock signal 4F occurring during the first quarter of the second one of the adjacent time slots given that the next subsequent time slot is not adjacent.

The logic one outputted from detector 480 register extends to latch 620 via lead 481 which forces the summed message sample respective to the first one of adjacent time slots on PSDAT bus 311 to be latched into select latch 620 thereby displacing the prefetched summed digital message samples respective to the second of the adjacent time slots.

RAM OUTPUT LATCH

RAM output latch 630 (FIG. 6) holds prefetched summed message samples outputted from accumulator RAM 510 (520) selected for supplying data to the output 750. RAM output latch 630, which is similar to select latch 620 and which is clocked by the 4F and 4T signals, alternates under control of the RAMSEL1 clock signal at lead 462 between receiving and holding summed message samples from accumulator RAM 510 (520).

When RAMSEL1 clock at lead 462 is a logic one, RAM output latch 630 receives and holds via bus 621 summed message samples from accumulator RAM 510 for outputting to out-adder 640 via the CSDAT data bus 635. RAMSEL1 clock signal at the logic zero state switches the input of RAM output latch 630 to accumulator RAM 520 for receiving summed message samples via data bus 622.

SAMPLE RAM MEMORY

As shown on FIG. 7, time slot address DRAD generated by address generator 320 on bus 319 leads a respective incoming IBDAT time slot by one-half time slot and is applied to the memory address input of sample RAM 610 (FIG. 6) for prefetching a previously stored message sample respective to the incoming time slot of a previous time frame prior to the storage of the incoming digital message sample of a current frame. The 2T clock signal directs the read/write cycle of sample RAM 610 respective to clock signal 4T.

Continuing in FIG. 7, for example, time slot address (DRAD) 254 precedes and overlaps incoming time slot (BDAT) 254 by one-half time slot and is applied to sample memory RAM 610 via bus 319. The occurrence of clock signal 2T at the logic one state and the second falling transition of clock signal 4T during IBDAT time slot 253 causes memory location 254 to be read and the contents stored in sample RAM 610 output latch (internal, not shown) on the following rising edge of 4T (not shown) for processing by out-adder 640 via message sample gate (MSG) 625. During IBDAT incoming time slot 254, the occurrence of clock signal 2T in the logic zero state and the first falling transition of clock 4T causes a new message sample respective to time slot 254, extended from bus 206, to be stored in memory location 254 of sample memory RAM 610. The prefetched message sample respective to time slot 254 held in sample RAM 610 output latch is then applied to message sample gate 625 via data bus 616 during time slot 254.

MESSAGE SAMPLE GATE

Message sample gate 625 is a 16 bit combinatorial logic circuit under control of sample control circuit 645 for inverting and gating to bus 626 either message samples outputted from sample RAM 610 or digital message IDLECODE, which is internally generated by message sample gate 625.

SAMPLE CONTROL CIRCUIT

Sample control circuit 645 is a combinatorial logic circuit similar to input control circuit 410 for controlling message sample gate 625 in accordance with the permissions established by the logic state of mode control bits CMBT and CMBR inputted at via leads 444 and 445 respectively. Maintenance signals (not shown) are also inputted to sample control circuit 645 for exercising the conferencer.

Sample control circuit 645 selects alternate message IDLECODE to be generated and gated through gate 625 for time slots assigned to the monitor mode. A time slot in the monitor mode has permission to only monitor a conference connection and therefore, message samples transmitted by the respective time slot are not permitted to be operative on the conference summed message outputted at 750.

Sample control circuit 645 is operative for selecting a message sample on bus 616 to be gated through gate 625 to data bus 626 when the logical state of the mode control bits CMBR and CMBT inputted via leads 644 and 645 respective to a time slot is either 01 (broadcast) or 11 (conference). A message sample contributed by a time slot in either the broadcast or conference mode is summed at the input by in-adder 310 with message samples contributed by other time slots assigned to the connection and stored in accumulator RAM 510 (520), and therefore, its message sample is allowed to be operative on outputted message samples. Whereas, a monitoring time slot is silent and its message contribution is not summed by in-adder 310 with the conference summed message sample. Therefore, the message sample of a monitoring time slot is not permitted to be operative on summed message samples supplied to output 750.

OUT-ADDER

Out-adder 640 is a twos-complement combinatorial logic circuit similar in circuitry to in-adder 310. Out-adder 640 includes saturation logic circuitry for detecting positive overflow or negative overflow as a result of summing a summed message sample inputted from output latch 630 via data bus 635 with an inverted message sample from gate circuit 625 via bus 626. Since a message sample inputted via bus 626 is an inverted replica of the message sample previously stored in sample RAM 610, it is essentially subtracted by out-adder 640 from the summed message sample inputted via bus 635 by the twos-complement addition. A message sample respective to a time slot is effectively subtracted in this manner from the summed message sample to eliminate its message contribution from the summed message before the summed message sample is outputted to the respective time slot at output 750. This circuit sequence ensures that sidetone is not transmitted to a respective time slot, since sidetone is provided by local telephone apparatus.

Out-adder 640 notifies output select circuit 710 via leads POOR or NOOR in the event either positive or negative overflow occurs as a result of summing an inputted summed message sample from bus 635 with a respective message sample inputted from bus 626.

OUTPUT BUFFER

Output select buffer 720 is a combinatorial logic circuit similar in circuitry to input select buffer 420, and is under control of output control circuit 710. Output select buffer 720 includes circuitry (not shown) for generating parity (not shown) over selected inputs outputted to output buffer 735 via data bus 734, and includes combinatorial circuitry for performing circuit maintenance functions (not shown) at the direction of an external central processing unit (not shown).

Inputs DFDAT and CSDAT to output select buffer 720 represent respectively the output from out-adder 640 via bus 641 and the output from latch 630. CSDAT is the cumulative conference message sample from accumulator RAM 510 (520) and includes the message sample contribution of the respective time slot. DFDAT is the cumulative conference message sample less the message sample contribution of the respective time slot. Alternate digital messages PMAX, NMAX and IDLECODE are also generated internally by output buffer 720 and were defined previously. Output select buffer 720 generates additional alternate digital messages (not shown) in response to circuit maintenance requests.

OUTPUT CONTROL CIRCUIT

Output control circuit 710 is a combinational logic circuit similar in circuitry to input control circuit 410 for controlling the outputting of selected ones of inputs to output select buffer 720. The outputs from output select control 710 correspond to respective inputs to output select buffer 720.

TABLE 3

| Output Select Control Input | | | | Output to |
|---|---|---|---|---|
| CMBR | CMBT | POOR | NOOR | Bus 734 |
| 0 | 0 | — | — | CSDAT |
| 0 | 1 | — | — | IDLECODE |
| 1 | 0 | 0 | 0 | DFDAT |
| 1 | 1 | 0 | 0 | DFDAT |
| 1 | 0 | 0 | 1 | NMAX |
| 1 | 0 | 1 | 0 | PMAX |
| 1 | 1 | 0 | 1 | NMAX |
| 1 | 1 | 1 | 0 | PMAX |

Table 3 illustrates symbolically, in a format similar to the format of the well-known truth table, the states of inputs to output select control 710 which in turn control the selection of corresponding ones of inputs to output buffer 720 for gating to bus 734.

In response to a positive or negative overflow signal from out-adder 640, via leads POOR or NOOR respectively, output select control circuit 710 directs output select buffer 720, via leads PFS and NFS respectively, to output alternate digital messages PFS (PMAX) or NFS (NMAX) to bus 734 respectively. IDLECODE is outputted by output buffer select 720 at the direction of output control circuit 710 via lead IDLC whenever the respective time slot has permission only to broadcast (mode control bits=01) to a conference session. IDLECODE is selected for outputting in accordance with Table 3 in this instance to ensure that a respective broadcast only time slot does not receive digital message samples from the conference session. Output select control 710 directs, via lead DFD, output buffer 720 to gate through the output (DFDAT) from out-adder 640 extended to output buffer 720 via DFDAT data bus 641, to respective time slots having permission to receive (CMBR=1) summed message samples from the conference session in the absence of overflow.

OUTPUT BUFFER

Output select buffer 720 extends the selected digital message sample to output buffer 735 via bus 734.

Output buffer 735 is a sequential circuit arrangement of master-slave flip-flops in which data on bus 734 is clocked into the master stage of output buffer 735 on the falling edge of the 4T clock within the LTC enable window; the contents of the master register is clocked into the slave register on the first rising edge of clock signal 4T within the LTC enable window for outputting to sixteen parallel bit bus 750.

The progression of a digital message sample through output latch 735 is arranged in accordance with clock signal 4T to allow an outputted message sample to be available for the full period of a time slot, instead of a portion of a time slot. Therefore, in accordance with this arrangement, an outputted message sample via data bus 750 lags the incoming (next) time slot (IBDAT) by one time slot. For example, a summed message sample respective to time slot 254 is available at output 750 at the start of input time slot 255.

A substitution of the master-slave register arrangement with standard flip-flops permits the output to be available via data bus 750 during the respective time slot.

ERROR/FAULT DETECTION

The parity processing circuits 31 and 32 of FIG. 4 are shown in greater detail in FIGS. 5 and 6. The summed data (SMDAT) is coupled to a parity tree 51, shown in greater detail in FIG. 11. The parity tree 51 generates a first parity bit ($P_{ACT}$) and delivers the same to the comparison circuit 53. The parity bits of the input data words to adder 310 and the carries from the summing operation are coupled to a parity tree 52, such as that shown in detail in FIG. 12. The output of parity tree 52 ($P_{EXP}$) is also coupled to the comparison circuit 53, and if these two input parity bits differ ($P_{EXP} \neq P_{ACT}$) a sum data parity error signal (SMPERR) is sent to the input select control 410.

In FIG. 6, the difference data output (DFDAT) from adder 640 is coupled to the parity tree 61, as well as to the output buffer 720. The parities of the input words to the adder 640 are passed therethrough and delivered to the parity tree 62 along with the carries from the binary arithmetic operation. The output of parity tree 61 ($P_{ACT}$) and parity tree 62 ($P_{EXP}$) are compared in the comparison circuit 63 and if these two parity signals differ a difference parity error signal (DFPERR) is delivered to the output select buffer 720.

The following truth table is descriptive of the functions of the input control circuit 1500. These functions remain the same as previously described in Table 2 except for the added functions provided by parity error signal, SMPERR. Other control signals listed in Table 2 that are not relevant to this invention are not shown for simplicity.

TABLE 4

| SMPERR | INIT | SELDAT |
|---|---|---|
| 0 | 0 | SMDAT |
| 0 | 1 | IBDAT |
| 1 | 1 | IC |
| 1 | 0 | PSDAT |

This truth table describes the actions at the control circuit 1500 in response to the sum data parity error signal (SMPERR) and the initialization signal (INIT), which has been previously described. The column designated SELDAT shows the selected data to be stored in an accumulator RAM 510 or 520 in response to the various combinations of the SMPERR and INIT signals. In the absence of error, the SMPERR signal is a binary "0" and in the presence of error this signal is a binary "1". The INIT signal, previously described, is a binary "1" when a conference connection requires initialization, and it is a binary "0" when no initialization is called for. Accordingly, when SMPERR=INIT=0, the sum data (SMDAT) from the adder 310 is stored in an accumulator RAM in a normal fashion. When SMPERR=0 and INIT=1, the input message sample (IBDAT) is stored, as previously described. When SMPERR=INIT=1, an idle code corresponding to "0" is selected to be stored in an accumulator RAM. This, in effect, "mutes" the sum data for this particular time slot, and also allows the conference connection to be initialized. Finally, when SMPERR=1 and INIT=0, the previous sum from an accumulator RAM (PSDAT) is selected to be written back into an accumulator RAM in the same storage location thereby effectively blocking or muting the sum data of the time slot for which error has been detected.

The following truth table describes the corrective actions taken when the parity circuitry of the invention detects a fault at the input to or the output from the adder 640. These actions remain the same as previously described in TABLE 3 except for the additional action provided by parity error signal, DFPERR. Other control signals listed in TABLE 3 that are not relevant to this invention are not shown for simplicity.

TABLE 5

| DFPERR | ODAT |
|--------|------|
| 0 | DFDAT |
| 1 | IC |

When there is no difference parity error (DFPERR=0), the difference data (DFDAT) from the adder 640 is typically coupled to output data (ODAT) bus 750. However, when a parity error is detected (DFPERR=1), the idle code (IC=0) is coupled to the output data bus 750. This, in effect, mutes the sum data sample for that particular time slot in which error has been detected.

From the foregoing explanation it will be evident to those skilled in the art that errors or faults are detected in real time and immediate action is taken on a faulty conference leg while not affecting the remaining legs in the conference or any other conference. The faulty leg is effectively "disconnected" for the duration, and only for the duration, of the fault.

PARITY CIRCUITS

FIGS. 11 and 12 show typical parity tree circuits for implementing the Boolean equations (1) and (2), supra. The sum data output ($S_1$–$S_{15}$) from adder 310, for example, is delivered to the parity tree of FIG. 11, which in response thereto generates a first parity bit ($P_{ACT}$). The carries ($C_2$–$C_{15}$) generated by the summing operation are coupled to the parity tree of FIG. 12, along with the parity bits ($P_A$ and $P_B$) of the input data words to the adder. The first stage of adder 310 has no carry input, i.e., $C_1=0$. The parity tree of FIG. 12 generates a second parity bit ($P_{EXP}$).

The generated first and second parity bits are compared in the comparison circuit 13 (an Excl-OR gate) of FIG. 12 and if they differ ($P_{ACT} \neq P_{EXP}$) an error signal (binary "1") is generated. A corrective action, such as previously decribed, is then taken.

As indicated, the parity trees of FIGS. 11 and 12 are "hardware" implementations of the Boolean equations (1) and (2), supra. The invention is, of course, not limited to these particular parity trees and it is well within the skill of those in the art to design other and different parity tree configurations for the intended purposes. In these figures, the gates 1101 and 1201, for example, are full-adders or, more specifically, 3-bit exclusive-NOR gates. The $S_1$ bit is inverted in inverter 1102 for circuit consistency. The gate 1103 is a (2-bit) Excl-NOR and gate 1202 is an Excl-OR. Since all of these gates and their functions are well known, detailed description of the same and of the parity trees would not appear to be necessary.

CONCLUSION

The present invention has been described with respect to its applicability to the signal processing circuitry of a digital conferencing system. However, it should be evident to those skilled in the art that the invention has wider application; for example, the invention can be used to reduce the complexity of testing VLSI circuits, which incorporate signal processing, during the manufacture thereof. Other applications of the present invention should come readily to mind. It is to be understood therefore that the invention is of general utility for the detection of errors in any and all binary arithmetic signal processing systems. Without further belaboring the point, it should be obvious at this time that the above described arrangement is merely illustrative of the application and of the principles of the present invention, and numerous modifications thereof may be devised by those skilled in the art without departing from the spirit and scope of the invention.

What is claimed is:

1. A signal processing system for a plurality of input data words, each of said plurality of input data words being accompanied by a parity check bit, comprising means for carrying out a binary arithmetic addition operation of said plurality of data words wherein carry bits are generated as a result of a modulo-2 addition of said plurality of data words, first parity means receiving the summed data output of the addition means and forming a first parity bit therefrom, second parity means receiving said generated carry bits of the addition operation and the parity bits of said input data words and serving to generate a second parity bit therefrom, and means for comparing said first and second parity bits to provide an error signal when said first and second parity bits differ.

2. In a signal processing system wherein a plurality of input digital signals of N-bits each are summed to provide a sum data word wherein carry bits are generated when said plurality of input digital signals are summed, each of said plurality of input digital signals being accompanied by a parity check bit, an error detection circuit comprising means responsive to the sum data word for forming a first parity bit, means responsive to said generated carry bits of the summing operation and the parity check bits of the input digital signals for forming a second parity bit, and means for comparing said first and second parity bits to provide an error indication for a single bit error in one of the input digital signals or in the sum data word.

3. An error detection circuit as defined in claim 2 wherein the first parity bit ($P_{ACT}$) is formed in accordance with the equation $$P_{ACT} = 1 \oplus S_1 \oplus S_2 \oplus \ldots S_N,$$

where $S_1, S_2 \ldots S_N$ represent the bits of the sum data word.

4. An error detection circuit as defined in claim 3 wherein the second parity bit ($P_{EXP}$) is formed in accordance with the equation $$P_{EXP} = 1 \oplus P_1 \oplus P_2 \oplus \ldots P_N \oplus C_1 \oplus C_2 \oplus \ldots C_N,$$

where $P_1, P_2 \ldots P_N$ represent the parity check bits of the input digital signals, and $C_1, C_2 \ldots C_N$ represent the carry bits of the summing operation.

5. An error detection system as defined in claim 4 wherein said equations are respectively implemented by first and second parity trees.

6. In a time division multiplex conferencing system for establishing a conference connection of n subscribers, the digital message samples of each of said n subscribers occupying a separate and distinct time slot of a repetitive frame, each of said message samples being accompanied by a parity check bit, comprising means for summing the message samples from a selected number of time slots of said repetitive frame corresponding to a number of said n subscribers in a conference to obtain a message sample sum wherein carry bits are generated as a result of the summing of said message samples, said conferencing system being characterized by first parity means responsive to said message sample sum for forming a first parity bit, second parity means receiving said carry bits of the summing operation and the parity bits of the digital message samples and serving to generate a second parity bit therefrom, and means for comparing said first and second parity bits to provide a fault indication when said first and second parity bits differ.

7. In a conferencing system as defined in claim 6 including means responsive to a fault indication for selectively muting said message sum.

8. In a conferencing system as defined in claim 7 wherein the message sum is muted during the interval and only during the interval of said fault indication.

9. A digital signal processor for a pair of input digital words of N-bits each, each of said input words being accompanied by a parity check bit, comprising binary arithmetic addition means for summing said pair of input digital words wherein carry bits are generated as a result of said summing of said digital words, parity tree means receiving the sum data output of said addition means and generating a first parity bit therefrom, another parity tree means receiving said carry bits generated by the summing operation and the parity check bits of said input words and generating a second parity bit therefrom, and comparison means for comparing said first and second parity bit to provide an error signal when the compared bits differ.

10. A signal processor as defined in claim 9 wherein the first parity bit ($P_{ACT}$) is generated in accordance with the Boolean equation $$P_{ACT} = 1 \oplus S_1 \oplus S_2 \oplus \ldots S_N.$$

where $S_1, S_2 \ldots S_N$ represent the bits of the summed data output of said addition means.

11. A signal processor as defined in claim 10 wherein the second parity bit ($P_{EXP}$) is generated in accordance with the Boolean equation $$P_{EXP} = 1 \oplus P_1 \oplus P_2 \oplus C_1 \oplus C_2 \oplus \ldots C_N,$$

where $P_1$ and $P_2$ represent the parity check bits of the pair of input digital words, and $C_1, C_2 \ldots C_N$ represent the carry bits of the summing operation.

12. A signal processor as defined in claim 11 including means responsive to an error signal for muting the sum data output.

13. A circuit for accepting a plurality of message samples at an input, each of said message samples arriving in a separate time slot within a repetitive frame comprising a predetermined number of time slots, each of said plurality of message samples being accompanied by a parity check bit, means for selectively summing a number of said plurality of message samples from groups of said time slots to form a plurality of summed message samples wherein carry bits are generated as a result of the summing operation, first storage means having a plurality of memory locations for storing each of said plurality of summed message samples accepted during a first time frame and for supplying said stored summation during a next second time frame, second storage means having a plurality of memory locations for storing each of said plurality of summed message samples accepted during said next second time frame and for supplying said stored summation during a next third time frame, means for selectively prefetching from said first or second storage means priorly stored summed message samples, wherein said message sample summing means includes means for combining message samples received with respect to any time slot of a group of time slots with said prefetched priorly stored summed message samples respective to said group, and summing control means operative when said group contains adjacent time slots for summing all of the message samples received with respect to all of said adjacent time slots with the same prefetched priorly stored summed message samples, said circuit being characterized by first parity means responsive to a summed message sample for producing a first parity bit, second parity means responsive to said carry bits generated by the summing operation and the parity check bits of said message samples for producing a second parity bit, and means for comparing said first and second parity bits to provide a fault indication when the compared bits differ.

14. A circuit as defined in claim 13 including means responsive to a fault indication to prevent said storing of a summed message sample.

* * * * *